United States Patent [19]
Cannon

[11] 3,999,825
[45] Dec. 28, 1976

[54] TUBING COUPLING WITH ELECTRICAL BONDING

[75] Inventor: Clifford D. Cannon, La Habra, Calif.

[73] Assignee: De Laval Turbine Inc., Los Angeles, Calif.

[22] Filed: Dec. 17, 1975

[21] Appl. No.: 641,389

[52] U.S. Cl. .............................. 339/15; 174/94 S; 285/373; 339/94 C; 117 R
[51] Int. Cl.² ......................................... H01R 3/04
[58] Field of Search ............ 339/15, 16, 8 R, 14 R, 339/14 L, 60, 61, 91 P, 94 C, 94 S, 117 R, 118, 221, 276 R; 174/78, 84 S, 94 S; 285/373, 419, 233

[56] References Cited
UNITED STATES PATENTS

| | | | |
|---|---|---|---|
| 3,737,144 | 6/1973 | Duncan | 285/373 X |
| 3,776,579 | 12/1973 | Gale | 285/373 X |

Primary Examiner—Roy Lake
Assistant Examiner—DeWalden W. Jones
Attorney, Agent, or Firm—Harris, Kern, Wallen & Tinsley

[57] ABSTRACT

A tubing coupling suitable for large diameter fuel lines in aircraft. A coupling comprising ferrules for the tubing ends with annular seals on each ferrule, a band positioned over the seals, a retainer with hinged sections positioned around the band and ferrules, and a bonding conductor in the retainer engaging both ferrules.

10 Claims, 5 Drawing Figures

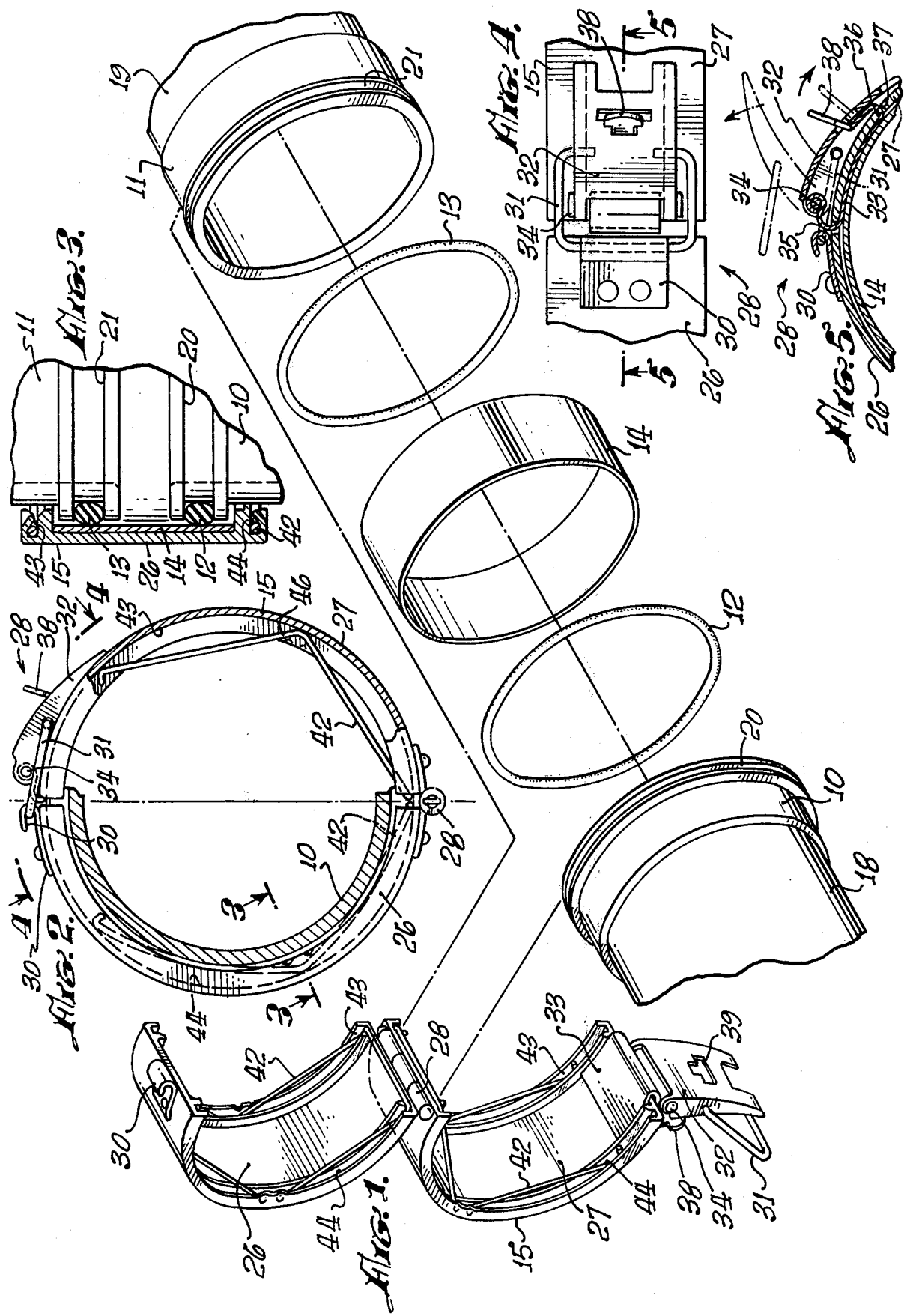

# TUBING COUPLING WITH ELECTRICAL BONDING

BACKGROUND OF THE INVENTION

This invention relates to coupling for tubing and in particular, to a new and improved coupling especially adapted for use with relatively large diameter rigid tubing of the type used for fuel lines in aircraft and the like.

Typically the couplings are intended for use with tubing of a diameter in the range of ½ to 6 inches. The tubing itself normally is rigid and it is a requirement that the coupling provide for relative motion between the lengths of joined tubing including axial translation, rotation and bending. Many installations also require electrical bonding between the lengths of tubing across the coupling.

Flexible couplings have been used for rigid fuel lines in aircraft for many years. A typical coupling is shown in U.S. Pat. No. 3,753,205. This coupling utilizes interengaging threaded members which axially compress the elastomer seals. Also, electrical bonding is provided by electrical pigtails fixed at each tubing end, with the pigtails joined by bolt and nut. An improvement on this coupling is shown in U.S. Pat. No. 3,891,291 which also uses interengaging threaded members for providing axial compression on the O-ring seals. A split ring is positioned about the tubing ends between the O-ring seals and carries a corrugated leaf spring for electrical contact with the tubing ends.

An alternative construction is shown in U.S. Pat. No. 3,186,739. This coupling utilizes interengaging threaded members for holding the coupling ends together, with the O-ring seals positioned in outwardly facing grooves of specific configuration, with one of the threaded members positioned about and engaging both seals. No provision is made for electrical bonding across the tubing ends. A variation on this construction has been proposed utilizing a band over the annular seals and a split ring over the band for holding the band and the tubing ends in position, with the split ring held in place by a spring clip.

These prior art couplings utilize a number of loose parts and the threaded units require two hands for assembly. The threaded units are relatively heavy and in the larger diameters become difficult to assemble.

Accordingly, it is an object of the present invention to provide a new and improved coupling which is relatively light in weight, simple in design and readily assembled with one hand. The latter is a significant feature in present day aircraft where fuel tanks are installed in the thin wing structures. A further object is to provide such a coupling which inherently provides electrical bonding and which automatically locks when assembled, without requiring a separate bonding wire or connection or a separate lock wire.

SUMMARY OF THE INVENTION

The flexible coupling includes ferrules for positioning at the ends of the tubing to be joined, an annular seal carried on each of the ferrules, a band positioned around the ferrules in sealing engagement with the seals, and a retainer assembly for enclosing the band and ferrules. In the preferred embodiment, the retainer assembly is provided with a latching assembly carried on the retainer assembly and actuable by one hand for completing the coupling. A bonding conductor, preferably in the form of a U-shaped flexible wire, is carried in the retainer assembly for engaging both ferrules when the retainer assembly is latched in position.

BRIEF DESCRIPTION OF THE DRAWING

FIG. 1 is an exploded view showing a tubing coupling incorporating the presently preferred embodiment of the invention;
FIG. 2 is a view partly in section showing the coupling in the locked position;
FIG. 3 is an enlarged partial sectional view taken along the line 3—3 of FIG. 2;
FIG. 4 is a view taken along the line 4—4 of FIG. 2; and
FIG. 5 is a sectional view taken along the line 5—5 of FIG. 4.

DESCRIPTION OF THE PREFERRED EMBODIMENT

The coupling in the drawing includes ferrules 10, 11, seals 12, 13, a band 14, and a retainer assembly 15. The ferrule 10 is mounted on the end of tube 18, typically by roll swaging. Alternatively, the ferrule may be welded or brazed to the tube or may be machined directly as part of the tube or other structure. The ferrule 11 is similarly affixed to another tube 19.

A seal is carried on each ferrule and in the embodiment illustrated, a conventional O-ring seal 12 is positioned in an annular groove 20 of the ferrule 10 and another O-ring 13 is positioned in an annular groove 21 of the ferrule 11. Other seal types and configurations may be used if desired.

A band or sleeve 14 is positioned over the ferrules in sealing engagement with the seals, as best seen in FIG. 3. Conventional lubrication may be used on the internal surface of the band for ease of installation and to preclude seal damage. The grooves 20, 21 in the ferrules, the seals 12, 13, and the band 14 are dimensioned so that the band engages the seals and provides compression sealing. The band preferably is made relatively thin and flexible so it can readily conform to the effective oval configuration which results when one of the tubes is bent relative to the other or to an oval ferrule resulting from the production or swaging operation, and still maintain an effective seal.

The retainer assembly 15 preferably is formed of retainser sections 26, 27 joined at a hinge 28. The free ends of the retainer sections 26, 27 are joined by a latch assembly 28. In the preferred embodiment of the latch assembly illustrated in the drawing, a clip 30 is fixed to the retainer section 26, typically by riveting. A ring 31 is carried on a lever 32 pivotally mounted on a catch 33. The catch 33 is formed from a resilient strip with one end wrapped around a pin 34 and having a U bend 35 over the end of the retainer section 27. Another U bend 36 passes through an opening 37 in the section 27, with a locking tongue 38 projecting outward. The locking tongue 38 preferably has a T-shape as seen in FIG. 4, and projects through a T-shaped opening 39 (FIG. 1) of the lever 32.

A bonding conductor is carried in each of the retainer sections 26, 27. While one conductor could be used, two are preferred for redundancy. In the preferred embodiment illustrated the bonding conductor is a U-shaped resilient wire 42 having the arms of the U disposed in grooves 43, 44 of the retainer section. The bonding conductors preferably are fixed in position in the retainer assembly, typically by crimping the side wall of the grooves 43, 44 at bends 46.

The retainer assembly functions to retain the band 14 in position and to engage the ferrules limiting axial separation of the two pieces of tubing and to provide an electrical bonding path between the two pieces of tubing.

In operation, the two pieces of tubing to be coupled are provided with the ferrules. The band is positioned over one of the pieces of tubing, the seals are placed in position on each of the ferrules, the tubing ends are brought into alignment and the band is pushed onto the seals. With the retainer assembly open as shown in FIG. 1, one section is positioned over the band and ferrules and the other section is pivoted to the closed position. With the latch lever 32 up as shown in phantom lines in FIG. 5, the ring 31 is engaged with the clip 30 and the latch lever is pushed down, with the tongue 38 moving through the opening 39 and locking the latching assembly. The bonding conductors 42 are brought into engagement with the ferrules as shown at the left in FIG. 2 providing a direct electrical path from ferrule to ferrule through the bonding conductor. An electrical conductive plating or coating may be provided on each ferrule for improved electrical contact if desired.

The latch assembly is an over center device which requires two motions for unlatching. The locking tongue 38 has to be moved to the right as shown in FIG. 5 and the lever 32 has to be raised while the tongue is held in the moved position.

The coupling provides for joining two rigid tubes while permitting relative motion between the tubes including axial translation, rotation and bending. Both fluid sealing and electrical continuity are maintained during such movement. Bending of one length of tubing with respect to the other produces an ovality at the line of engagement between the seal and the band. The flexible band readily conforms to the ovality and maintains a more uniform seal squeeze.

The retainer assembly with the integral bonding conductors and latch assembly has no loose parts being a single assembly, and is readily installed in close quarters using one hand. No separate bonding connections or lock wiring is required. The catch 33 of the latch assembly serves as a mount for attaching the latch lever to the retainer section, provides a pivot for the latch lever and also a lock. The catch with the latch and ring can be removed and replaced on the retainer section when desired.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim:

1. In a coupling for joining first and second tubing ends while permitting axial translation, rotation and bending between the first and second tubes, the combination of: ;
   first and second ferrules for positioning at the respective tubing ends;
   an annular seal carried on each of said ferrules;
   a band positioned around said ferrules in sealing engagement with said seals;
   a retainer assembly comprising at least two sections joined together for enclosing said band, said sections having inner flanges for engaging said ferrules; and
   a resilient electrical bonding conductor carried in one of said retainer sections in engagement with each of said ferrules when said retainer assembly is positioned about said ferrules.

2. A coupling as defined in claim 1 wherein said bonding conductor is a U-shaped wire fixed in said section with the respective arms of the U engaging the respective ferrules.

3. A coupling as defined in claim 2 including another U-shaped wire as a bonding conductor fixed in the other retainer section.

4. A coupling as defined in claim 1 wherein said one retainer section has a groove in each of said flanges, and said bonding conductor is a U-shaped wire with each arm disposed in a flange groove.

5. A coupling as defined in claim 4 with each of said arms of said conductors having a bend and with said arms fixed in said grooves at said bends.

6. A coupling as defined in claim 1 wherein said band is flexible.

7. A coupling as defined in claim 1 wherein said retainer assembly sections are joined by a hinge at one end and by a latch assembly at the other end.

8. A coupling as defined in claim 7 wherein said latch assembly includes:
   first and second interengaging members with said first member carried on one of the retainer sections; and
   a latch lever pivoted at the other of said retainer sections and carrying said second member.

9. A coupling as defined in claim 8 including a catch member carried on the other of the retainer sections with said latch lever pivotally mounted thereon, and with said catch member including a locking tongue for engaging an opening in said latch lever.

10. A coupling as defined in claim 9 wherein the other of the retainer sections has an opening adjacent the latch assembly end, and said catch member comprises a folded resilient strip positioned about said end and in said opening in retaining condition, with said latch lever and locking tongue at opposite ends of said strip.

* * * * *